United States Patent [19]

Gray

[11] Patent Number: 4,515,043

[45] Date of Patent: May 7, 1985

[54] CARBURETOR ADJUSTMENT TOOL

[75] Inventor: Billy C. Gray, Los Cruces, N. Mex.

[73] Assignee: The United States of America as represented by the Secretary of the Army, Washington, D.C.

[21] Appl. No.: 519,932

[22] Filed: Aug. 3, 1983

[51] Int. Cl.³ .............................................. B25B 17/00
[52] U.S. Cl. .................................... 81/57.22; 81/57.27; 81/57.29; 81/57.32; 81/57.36; 74/665 GB
[58] Field of Search ................. 81/54.57, 57.13, 57.22, 81/57.27, 57.29, 57.32, 57.36; 74/665 GB, 417

[56] References Cited

U.S. PATENT DOCUMENTS

| | | | |
|---|---|---|---|
| 989,373 | 4/1911 | Lindgren | 74/665 GB |
| 1,536,157 | 5/1925 | Slack | 81/57.22 |
| 2,090,964 | 8/1937 | Riemke | 81/57.29 |
| 2,703,030 | 3/1955 | Marvin | 81/57.29 |
| 2,964,152 | 12/1960 | Banner | 81/57.22 |
| 3,707,893 | 1/1973 | Hofman | 81/57.29 X |
| 3,847,039 | 11/1974 | Azuma | 81/57.29 X |

FOREIGN PATENT DOCUMENTS 365681 12/1963 Switzerland ...................... 81/57.36

Primary Examiner—Frederick R. Schmidt
Assistant Examiner—Debra S. Meislin
Attorney, Agent, or Firm—Anthony T. Lane; Robert P. Gibson; Saul Elbaum

[57] ABSTRACT

A hand held and operated tool for quickly and accurately adjusting the idle mixture adjustments of multiple barrelled carburetors. The tool has a pair of screwdrivers with flexible shanks which can be applied to the idle mixture adjustment screws and turned in unison by turning a knob on a gear box, or the shanks can be separately turned to provide fine tuning of the idle mixture adjustments.

5 Claims, 4 Drawing Figures

CARBURETOR ADJUSTMENT TOOL

RIGHTS OF THE GOVERNMENT

The invention described herein may be manufactured, used and licensed by or for the United States Government without the payment to me of any royalty thereon.

BACKGROUND OF THE INVENTION

This invention relates to an improved tool for adjusting carburetors of internal combustion engines, and more particularly a tool for quickly and accurately adjusting the idle mixture controls on the carburetors of multiple or single barrelled automobile carburetors. A large percentage of gasoline automobile engines are equipped with double barrelled carburetors. For example, a V-8 engine invariably has two intake manifolds, one connected to each of the two sides thereof, with each of the two barrels of a double barrelled carburetor connected to a different one of the intake manifolds, or each pair of barrels of a four barrelled carburetor to a different one of the intake manifolds. Most modern carburetors have fixed metering rods for vaporizing the gasoline at speeds above idle and have adjustable idle mixture screws for controlling the air to fuel mixture ratio at low or idling speeds. The proper adjustment of these controls insures that the engine will idle at a speed which will prevent engine stalling and also will not result in excessive air pollution which can result from an overly rich mixture. Lean mixtures can result in stalling and also causes engine overheating if the engine idles for long periods. Multiple barrelled carburetors are in effect two or more separate carburetors in a common housing and the idle mixture adjustments must both or all be separately adjusted for optimum operation. The usual practice prior to the present invention was to close the idle mixture needle valves by turning the idle mixture adjustment screws all the way in. The valves would then be gradually opened by alternately unscrewing each adjustment screw while listening to the engine, checking the exhaust or obtaining a desired idle rpm. A simple screwdriver was usually used for this adjustment.

The present invention provides a tool which can simultaneously adjust both of the idle mixture adjustment screws of a double barrelled carburetor, and it is also capable of independently adjusting either one of these screws, to fine tune the adjustment so that both carburetor barrels will be adjusted in an optimum manner. The tool can also be used to adjust single barrelled and four barrelled carburetors.

SUMMARY OF THE INVENTION

The apparatus comprises a pair of screw drivers adapted to simultaneously engage the idle mixture adjusting screws of double barrelled carburetors. The two flexible screwdriver shanks are connected to a housing or gear box comprising a main drive shaft which is arranged to separately rotate each of the shanks at the same speed of rotation through bevel gear drives. The main shaft is hand driven by means of an external knob to simultaneously adjust both of the idle mixture controls. The main drive shaft can also be disengaged from both screwdriver shanks by pushing in on the knob and operating a latch on the opposite side of the housing. The screwdriver shanks have hand operable discs attached thereto whereby each shank may be independently turned to provide fine tuning of the idle mixture controls when the main drive shaft is disengaged. The screwdriver blades are provided with shrouds to facilitate engaging the idle mixture screw heads.

It is thus an object of the invention to provide a tool which can simultaneously adjust the two idle mixture controls of double barrelled carburetors and which can also be used to separately adjust each one of the said controls for the fine tuning of the idle mixture adjustment of vehicles with double barrelled carburetors.

A further object of the invention is to provide a mechanism comprising a gear box adapted to simultaneously drive a pair of screw or nut drivers attached to the ends of two flexible shanks by means of a hand operated knob attached to a main drive shaft in said gear box, and whereby said shanks may be disengaged from said knob and main drive shaft and separately rotated by means of hand operated means attached to said shanks whereby said mechanism can be used to simultaneously adjust a pair of screws or nuts.

A further object of the invention is to facilitate the proper adjustment of multiple barrelled carburetors of vehicles by providing a tool especially designed to quickly and accurately permit such proper adjustment.

These and other advantages of the invention will become apparent from the following detailed description and the drawings.

DETAILED DESCRIPTION OF A PREFERRED EMBODIMENT

Figure 1:
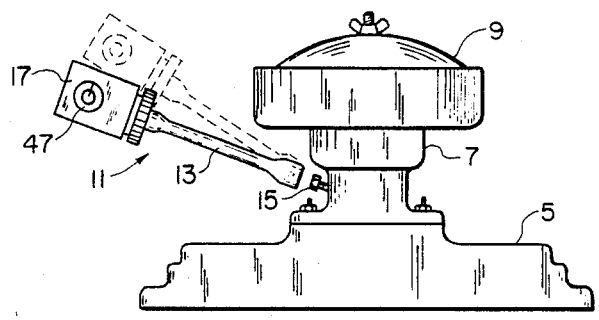
FIG. 1 shows the novel tool in use for its intended purpose.

FIG. 1 shows a carburetor 7 mounted on an engine 5 with an air cleaner 9 supported above the carburetor in usual fashion. The carburetor has one or more idle adjustment screws 15 usually comprising knurled and slotted screw heads. Carburetors have one of these adjustment screws for each barrel thereof. The second idle adjustment screw of the double barrelled carburetor of FIG. 1 is directly behind the illustrated screw. The carburetor adjustment tool of the present invention 11, better illustrated in FIG. 2, comprises a pair of flexible screw driver shanks 13 and 19, each with shrouded screw driver blades 25 and 27, respectively. The shrouds 21 and 23 may comprise cylindrical bores in which the blades 25 and 27 are located. The shrouds are arranged to encircle the heads of the idle adjustment screws, such as 15 of FIG. 1 to prevent the blades from disengaging from the slots thereof. In operation, the housing or gear box 17 of the tool would usually be held in the mechanic's left hand with the blades 25 and 27 engaging the idle adjustment screws and the controls thereof would be manipulated with the mechanic's right hand, as will be explained in greater detail below. FIG. 1 shows in dashed outline how the flexible shanks 13 and 19 permit the housing 17 of the device to assume different positions while the screw driver blades are both engaged. Also, the two adjustment screws of double barrelled carburetors are usually very close together and the flexible shanks can accommodate such screws. The flexible portions of the shanks can be made of material such as hard rubber or a coiled metal helix and must have sufficient stiffness so that sufficient force can be transmitted therethrough from the mechanic's hand to hold the shrouded screwdriver blades in place on the adjustment screws.

Figure 2:
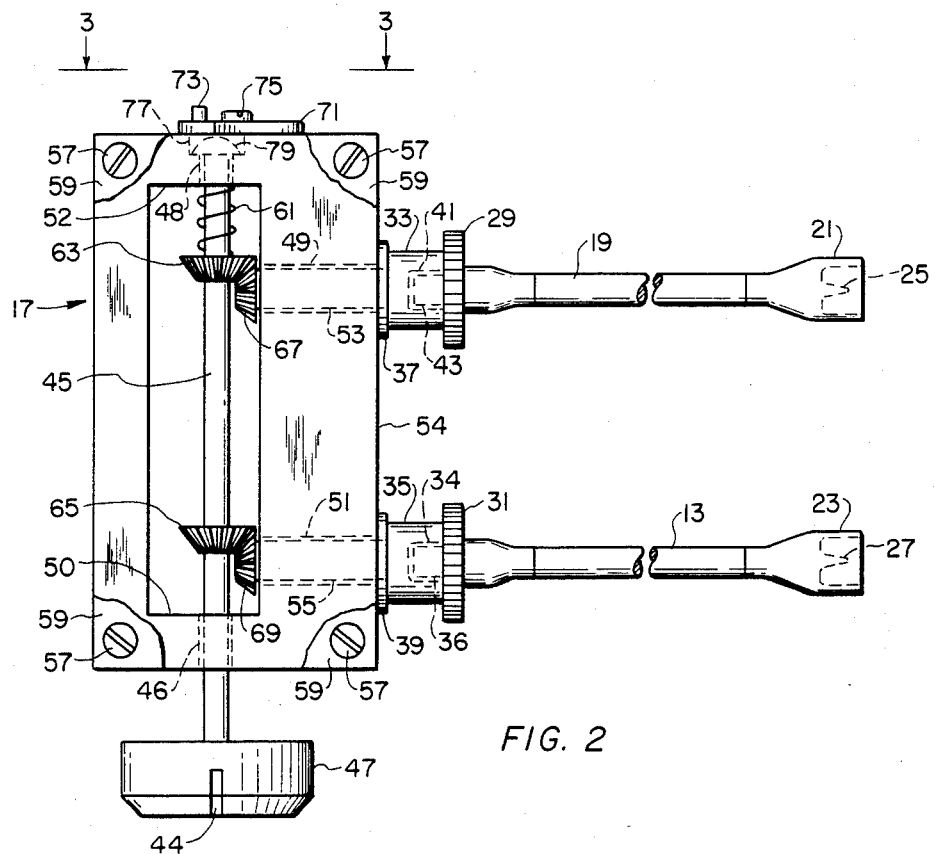
FIG. 2 is a top view of the device showing internal details of the housing thereof.

FIG. 2 is a top view of the device with the top cover 59 broken away to show internal details. The four screws 57 hold the cover 59 on. The gear box 17 comprises a rectangular metal housing with the main shaft 45 running through the longer dimension thereof and journaled in bore 46 in the front wall 50 of the housing and in bore 48 in the rear wall 52 thereof. A recess 77 in rear wall 52 houses the enlarged end 79 of the main shaft 45. This enlarged end is shown as hemispheric but it may have other shapes, for example it could be simply a cylinder of larger diameter than shaft 45, or it could be a collar slipped over the end of shaft 45 and secured thereto with a set screw. A pair of bevel gears 63 and 65 are attached to main shaft 45 and are arranged to drive a pair of similar bevel gears 67 and 69 which are attached to the shafts 53 and 55 which are journaled in bores 49 and 51 respectively in the side wall 54 of the housing. The shaft 53 drives coupling head 33 which is adapted to receive the flexible shank 19 with its shrouded screwdriver blade 25. The coupling head may comprise a square or hexagonal hole 41 adapted to receive a mating male member 43 attached to or forming part of the shank 19. The milled disc 29 is attached to the shank 19. A felt washer 37 may provide lubrication for these moving parts.

The structure of the other screwdriver mechanism is the same as that described and comprises the shank 13 with the shrouded blade 27, the milled disc 31, the felt washer 29, coupling head 35, hole 34 therein and mating male member 36.

The helical spring 61 is mounted over main shaft 45 between rear wall 52 and the rear of bevel gear 63 so that the spring urges both bevel gears 63 and 65 into engagement with the other two bevel gears which drive the output or screwdriver shanks. All of the bevel gears have the same number of teeth for standardization purposes and to provide a one to one ratio between the main shaft and each of the output shafts. Thus when the hand operated knob 47 of FIG. 2 is turned, both of the screwdrivers will be rotated in unison therewith.

Figure 3:
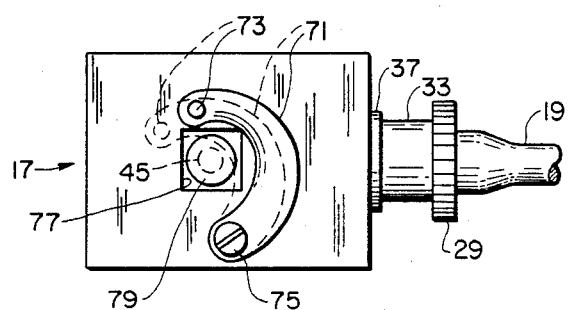
FIG. 3 is an end view of the housing showing the latching mechanism.
Figure 4:
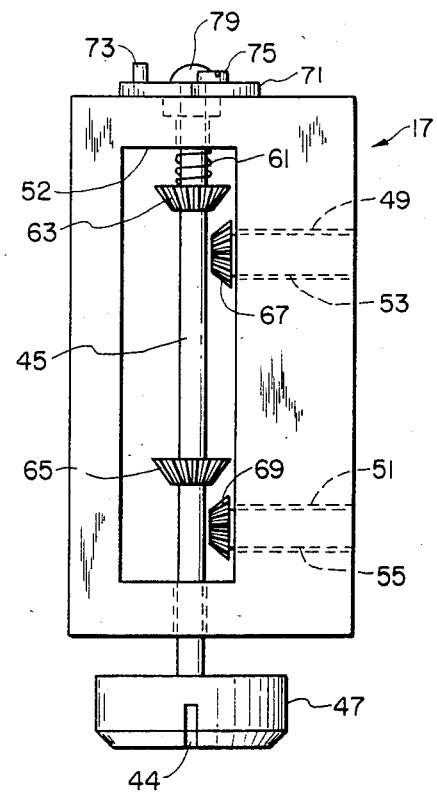
FIG. 4 is a top view of the housing of the device showing the screwdriver shanks disengaged from each other and from the operating knob.

When it is desired to adjust each of the idle mixture screws independently, the two bevel gears on the main shaft 45 are disengaged from the output bevel gears so that the discs 29 and 31 can be separately rotated by hand. In order to accomplish this disengagement, the knob 47 is pushed in so that the round head or enlarged rear portion 79 of the shaft 45 is pushed out of the rear wall 52 of the housing so that a latch mounted on the outside of the rear wall can be moved under the shoulder formed by the enlarged portion 79 to lock the shaft in the disengaged position. FIG. 4 shows the device in this disengaged position. The end view of the rear wall 52 of FIG. 3 shows a simple type of latch for locking the shaft. As can be seen therein, the recess 77 is made large enough to accommodate the enlarged head 79 of the shaft 45. The latching mechanism comprises a curved arm comprising a piece of flat material 71, which may be either metal or plastic, which pivots around screw 75 which is threaded in rear wall 52. A pin 73 near the other end of arm 71 provides an operating handle. The full-lined arm 71 of FIG. 3 shows the latch disconnected so that the gears are engaged as shown in FIG. 2. The dashed-line position of arm 71 of FIG. 3 shows how the upper end of this arm can be pivoted to the left while the shaft 45 and its enlarged end are pushed to the rear, so that the arm 71 swings under the shoulder formed by end 79 to hold the shaft in the disengaged position as illustrated in FIG. 4. When the latch is disengaged the spring 61 pushes the shaft forward and engages all of the gears.

A recommended procedure for effectively using this tool would be to first disengage the gears as explained above, place the shrouds 21 and 23 over the two idle mixture control screw heads and insert the blades 25 and 27 in their respective slots of the screws by turning milled discs 29 and 31 while maintaining a gentle pressure on the flexible shanks 13 and 19. The discs 29 and 31 are then turned separately until each idle mixture screw is in its off position which is normally all the way in. The latching mechanism 73 is then disengaged to connect the two screwdrivers to knob 47 which is then turned in the proper direction to unscrew the two idle mixture screws in unison to thereby enrich the idling fuel to air mixture of both carburetor barrels. The proper mixture can be determined in different ways, for example by observing a tachometer and adjusting for a certain rpm, or backing the adjustments off until the rpm starts to drop due to an overly lean mixture and then enriching the mixture slightly by turning the knob 47 a fraction of a revolution in the opposite direction. The mark 44 on the knob 47 facilitates this adjustment.

Also the proper adjustment may be obtained by observing or testing the exhaust gases for pollutants, for example carbon monoxide in the exhaust usually indicates an overly rich mixture.

As stated above, optimum performance may require different adjustments for the two idle mixture controls, for example some V-8 engines are provided with dual exhaust systems with each system connected to a different side of the engine, and each barrel of the double barrelled carburetor supplies a different side of the engine via separate intake manifolds. Oftentimes unbalanced idle mixtures for such engines will be apparent from the two exhaust pipes, for example one may be emitting a black smokey exhaust and the other a cleaner exhaust. Such situations can be taken care of by the present invention by latching the gears in the disengaged position and separately turning one or the other of the milled discs 29 or 31 until optimum adjustment is obtained.

This tool can also be used with four barrelled carburetors by adjusting two of the idle mixture controls thereof at a time.

The shanks of the screwdrivers are made long enough to reach the idle adjustment screws with the air cleaner installed, as illustrated in FIG. 1. The usual practice in the absence of the present invention is to remove the air cleaner to facilitate access to the adjustment screws with a simple screwdriver. This does not permit accurate adjustment since the air supply is reduced slightly when the air cleaner is reinstalled, thus changing the fuel to air ratio somewhat. Also, the use of flexible insulated shanks such as the hard rubber mentioned above provides electrical insulation which reduces the danger of electric shock.

It wish it to be understood that I do not desire to be limited to the exact details of construction shown and described, for obvious modifications can be made by a person skilled in the art.

I claim:

1. A carburetor adjustment tool comprising:
   a pair of shrouded screwdriver blades attached to a gear box through flexible shanks;
   said gear box having a front wall and a rear wall;
   said gear box having a main shaft running therethrough which is connected to a hand operable knob at one end thereof;
   said main shaft has an enlarged end opposite from said knob and said enlarged end is journaled in a bore in the rear wall of said gear box;
   said main shaft having a pair of bevel gears thereon which can engage mating bevel gears on two output shafts which are connected to said shanks;
   said main shaft being spring loaded so that said bevel gears are normally engaged;
   means for disengaging said pair of bevel gears on said main shaft from said mating bevel gears on said output shafts by sliding said main shaft toward said rear wall such that said enlarged end exits from said bore;
   means for latching said gears in the disengaged position;
   said means for latching said gears in the disengaged position is pivoted on the outside of said rear wall such that it is pivotally movable under the enlarged end of said main shaft when said main shaft has been slid toward said rear wall; and
   each of said shanks having hand operable discs thereon.

2. The tool of claim 1 wherein said shanks are of hard rubber of sufficient stiffness to transmit the required pressure to hold said shrouded screwdriver blades on the heads of screws to be turned by said blades.

3. The tool of claim 1 wherein said means to latch said gears in the disengaged position comprises a flat curved latch.

4. A carburetor adjustment tool comprising:
   a rectangular gear box having a front wall and a rear wall;
   a slidable main shaft running lengthwise through said gear box;
   said main shaft having a knob on one end and an enlarged portion on the other end;
   said enlarged portion of said main shaft is disposed on the outside of said gear box in a recess in said rear wall such that when said knob is pushed in toward said gear box said enlarged end exits from said recess;
   a first bevel gear on said main shaft;
   a second bevel gear on said main shaft spaced apart from said first bevel gear;
   a first output shaft running through a side wall of said gear box;
   a second output shaft running through the same side wall of said gear box as does the first output shaft;
   said first output shaft has a bevel gear which mates with said second bevel gear on said main shaft;
   a first flexible shank connected to said first output shaft;
   a second flexible shank connected to said second output shaft;
   a first shrouded screwdriver connected to said first flexible shank;
   a second shrouded screwdriver connected to said second flexible shank;
   said first flexible shank having a hand operable disc thereon;
   said second flexible shank having a hand operable disc thereon;
   a spring disposed on said main shaft for urging said first and second bevel gears into engagement with the bevel gears on said first and second output shafts such that said first and second flexible shanks, and said first and second shrouded screwdrivers, can be rotated in unison by said knob; and
   a latch which pivots on the outside rear wall of said gear box and which is pivotally movable under the enlarged end of said main shaft when said main shaft is pushed inward by pressure on said knob such that said first and second bevel gears are disengaged from the bevel gears on said first and second output shafts so that said hand operable discs may be separately turned.

5. The tool of claim 4 wherein said latch comprises a curved flat piece.

* * * * *

UNITED STATES PATENT OFFICE
CERTIFICATE OF CORRECTION

Patent No. 4,515,043        Dated May 7, 1985

Inventor(s) Billy C. Gray

It is certified that error appears in the above-identified patent and that said Letters Patent are hereby corrected as shown below:

Delete the following from cover page:

(73) Assignee: The United States of America as represented by the Secretary of the Army, Washington, D.C.

Signed and Sealed this

Seventeenth Day of September 1985

[SEAL]

Attest:

Attesting Officer

DONALD J. QUIGG

Commissioner of Patents and Trademarks—Designate